United States Patent
Cola

(10) Patent No.: US 8,763,894 B2
(45) Date of Patent: Jul. 1, 2014

(54) METHOD AND SYSTEM FOR GENERATING TRACING INFORMATION FOR GAS CYLINDERS

(75) Inventor: Gian Luigi Cola, Venice (IT)

(73) Assignee: Faber Insustrie S.p.A., Cividale del Friuli (UD) (IT)

( * ) Notice: Subject to any disclaimer, the term of this patent is extended or adjusted under 35 U.S.C. 154(b) by 14 days.

(21) Appl. No.: 13/580,975

(22) Filed: Aug. 24, 2012

(65) Prior Publication Data

US 2013/0043301 A1 Feb. 21, 2013

Related U.S. Application Data

(63) Continuation of application No. PCT/IT2010/000083, filed on Feb. 26, 2010.

(51) Int. Cl.
- *G06F 17/00* (2006.01)
- *F17C 1/00* (2006.01)
- *H05K 3/30* (2006.01)
- *H01R 9/00* (2006.01)
- *H05K 3/00* (2006.01)

(52) U.S. Cl.
USPC ............... 235/375; 220/581; 29/835; 29/844

(58) Field of Classification Search
USPC .......................................... 220/581; 235/375
See application file for complete search history.

(56) References Cited

U.S. PATENT DOCUMENTS

| | | | |
|---|---|---|---|
| 3,024,936 A | 3/1962 | Logue, Jr. | |
| 4,461,657 A * | 7/1984 | Rana et al. | 420/83 |
| 5,191,992 A * | 3/1993 | Darley | 220/214 |
| 8,180,174 B2 * | 5/2012 | Di Venuto et al. | 382/276 |
| 2006/0191993 A1 * | 8/2006 | Markham et al. | 235/376 |
| 2008/0277036 A1 * | 11/2008 | Johansen | 148/689 |
| 2010/0001075 A1 * | 1/2010 | Barkan | 235/462.41 |
| 2010/0067748 A1 * | 3/2010 | Rowe | 382/115 |
| 2010/0107628 A1 * | 5/2010 | Schaffer | 60/527 |

FOREIGN PATENT DOCUMENTS

| | | |
|---|---|---|
| EP | 1998100 A1 | 12/2008 |
| WO | 03058532 A1 | 7/2003 |
| WO | 2005075880 A1 | 8/2005 |

* cited by examiner

*Primary Examiner* — Thien M Le
*Assistant Examiner* — Asifa Habib
(74) *Attorney, Agent, or Firm* — Robert E. Alderson, Jr.

(57) ABSTRACT

Methods for generating tracing information for gas cylinders are provided comprising a metal cylinder body manufactured from an unrefined metal piece, wherein such a method comprises the steps of equipping the metal piece with an individual marking, identifying, during at least one transformation or control step of the piece, an identification code of the piece by reading the individual marking and associating one or more process parameters of the transformation step or control results with the identification code, and storing the process parameters and the association with the identification code in a database. Systems for generating tracing information for gas cylinders are also provided.

25 Claims, 6 Drawing Sheets

METHOD AND SYSTEM FOR GENERATING TRACING INFORMATION FOR GAS CYLINDERS

CROSS-REFERENCE TO RELATED APPLICATIONS

This application is a National Phase Application of PCT International Application No. PCT/IT2010/000083, International Filing Date Feb. 26, 2010, which is hereby incorporated by reference in its entirety.

FIELD OF THE INVENTION

The object of the present invention is a method and a system for generating tracing information for gas cylinders understood to mean transportable containers able to be used to store gas under pressure.

BACKGROUND OF THE INVENTION

The gas cylinders in question are made from metal, for example steel, starting from an unrefined piece cut from a sheet metal reel, from a tube or from a billet and subjected:
- to a plurality of transformation steps that modify both the shape and the mechanical characteristics of the piece so as to obtain the gas cylinder with the desired shape and material characteristics and
- to a plurality of checking and selection steps to identify and/or discard the pieces the checked characteristics of which do not correspond to predetermined target characteristics and
- optionally, to assembly steps to complete the gas cylinder, for example the application of accessories or filament winding and curing in the case of a composite gas cylinder and
- optionally, to finishing steps, for example the painting of the finished gas cylinder.

In order to be able to find out the production batch of the unrefined material (reel of sheet metal, tubes or billets usually supplied by an external supplier to the manufacturing premises of the gas cylinders), it is known to equip all unrefined pieces of a production batch before the transformation steps with an initial marking comprising a stamped alphanumeric batch code that identifies such a production batch.

It is also known to equip each individual gas cylinder manufactured, after the transformation steps, with an individual final marking that comprises a stamped alphanumeric identification code that identifies the individual gas cylinder.

During a checking and selection step, for example during a hydraulic or volumetric expansion test of a gas cylinder, it is thus possible to store the identification code of the cylinder in a database and associate the result of the test with such an identification code.

The known method and system thus allows both the production batch of the unrefined material and the results of the hydraulic test to be traced and associated with each individual gas cylinder.

Indeed, in the technical field of gas cylinders it is believed that the technical characteristics of the individual gas cylinder depend mainly upon the characteristics of the unrefined material, whereas the influence of the individual metallurgic transformation steps (heat treatments and deformations) can be summarily considered through the outcome of the suitability tests, for example the volumetric expansion test, carried out on the finished gas cylinder.

Moreover, in the state of the art, it is not considered necessary to identify the individual unrefined piece or the individual semi-worked cylinder during the metallurgic transformation steps, since all of the pieces from the same production batch are considered to be the same and subjected to the same process.

Whilst we acknowledge this commonly held opinion, according to which the influence of the individual metallurgic transformation steps, i.e. the heat treatments and deformations, can be summarily considered through the positive or negative outcome of the suitability tests of the gas cylinders, the author of the present invention believes that this is a technical prejudice that, as a consequence, prevents it from being possible to identify or group gas cylinders already in use according to more specific and focused criteria of just the production batch of the unrefined material.

Indeed, in the hypothetical case of withdrawal from service of gas cylinders mounted for example in gas-powered vehicles or else in other uses, it would currently be necessary to extend the withdrawal to all the cylinders of an entire production batch of the unrefined material, whereas it would be useful to be able to limit the total number of cylinders involved based on a more detailed "manufacturing history" of each individual gas cylinder.

The purpose of the present invention is therefore to devise a method and a system for generating tracing information for gas cylinders, having characteristics such as to reconstruct a more detailed manufacturing history for each individual gas cylinder manufactured, so as to be able to identify or group together gas cylinders, by indeed intervening on the individual cylinder, based on one or more manufacturing conditions such as selection parameter.

This and other purposes are accomplished through a method for generating tracing information for gas cylinders comprising a metal cylinder body manufactured through the steps of:
- providing an unrefined metal piece;
- subjecting the unrefined metal piece to a plurality of transformation steps so as to obtain the cylinder body with the desired shape and material characteristics, wherein said transformation steps comprise:
  A) one or more heat treatment steps such as to modify the mechanical characteristics of the piece and,
  B) one or more deformation steps that modify the shape of the piece,
- subjecting the unrefined piece or the cylinder body obtained from it to at least one control step,
in which said method comprises the steps of:
- equipping the unrefined metal piece before the transformation steps, with an individual marking that comprises an identification code of the individual piece,
- reading the individual marking applied onto the unrefined piece and storing the read identification code in a database,
- identifying, during at least one of the transformation steps or during said control step, the identification code of the piece or of the cylinder body obtained from it by reading the individual marking and associating one or more process parameters of said transformation step or a result of said control step with said identification code,
- storing said process parameters of said transformation step or said result of said control step and the association with said read identification code in the database.

Thanks to the marking through an identification code of the single piece and the association of process parameters of heat treatments and/or deformations or of results of tests with the identification code of the single piece it is possible to reconstruct the manufacturing history of each individual gas cylinder in greater detail and, therefore, to identify individual gas cylinders in a targeted manner based on specific selection parameters.

In order to better understand the present invention and appreciate its advantages some non-limiting example embodiments thereof will be described hereafter, with reference to the figures, in which:

DETAILED DESCRIPTION

With reference to the figures, gas cylinders 1 comprising a metal cylinder body 2, for example made from steel, can be manufactured through the steps of providing an unrefined metal piece 3 and subjecting the unrefined metal piece 3 to a plurality of transformation steps so as to obtain the cylinder body 2 with the desired shape and material characteristics.

The transformation steps comprise one or more heat treatment steps such as to modify the mechanical characteristics of the piece 3 and one or more deformation steps that modify the shape of the piece 3.

Figure 1:
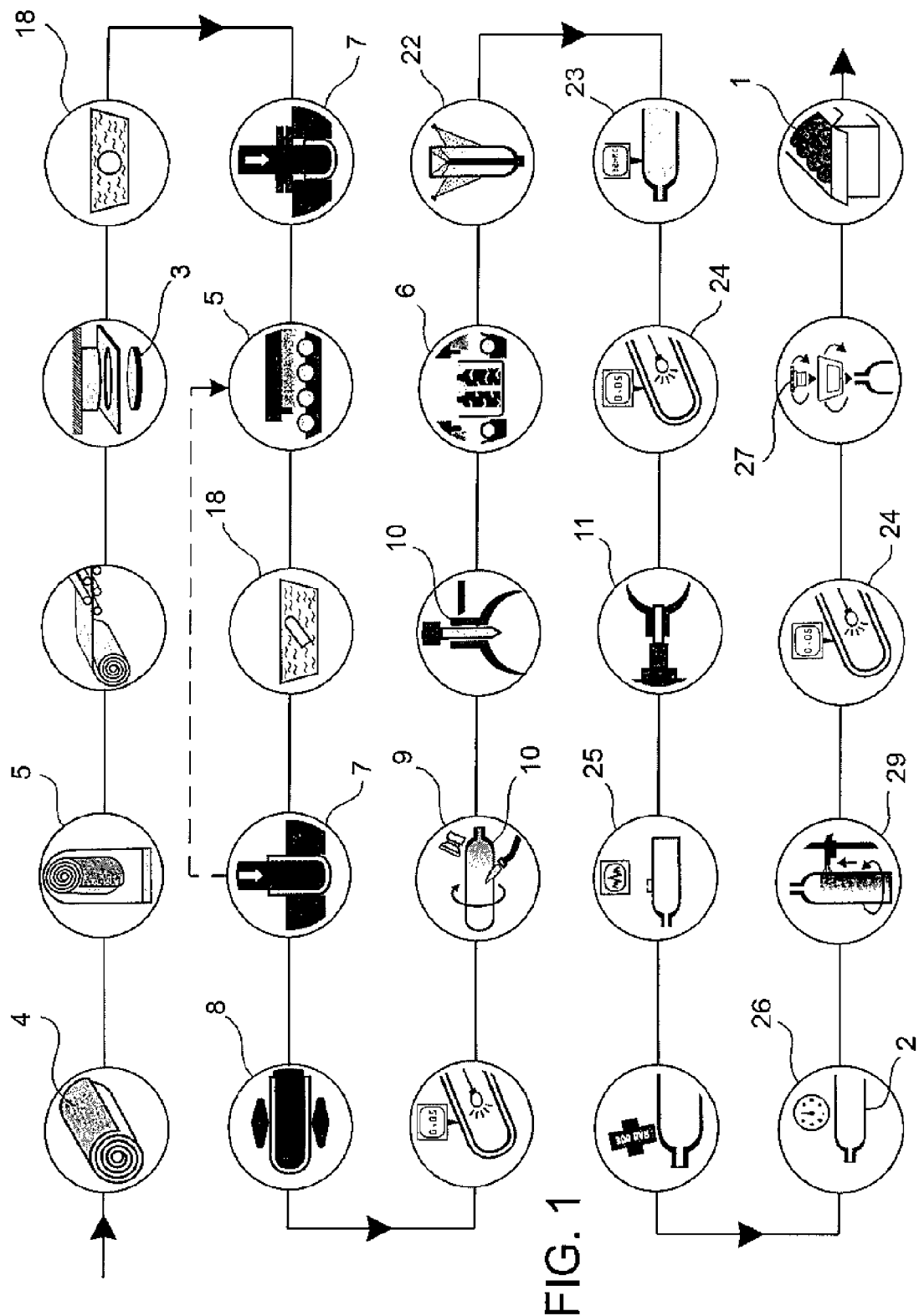
FIG. 1 is a schematic representation of a process for manufacturing gas cylinders with a metal cylinder body from an unrefined piece cut from a reel of sheet metal.

With reference to the example of FIG. 1 that represents the manufacture of the gas cylinder 1 from an unrefined piece 3 cut from a reel of sheet metal 4, the heat treatment steps can comprise one or more annealing steps 5 and/or one or more quenching and tempering steps 6, whereas the deformation steps can comprise one or more of the following steps:
  cold deep-drawing 7,
  flow forming 8,
  neck spinning 9 of the nozzle 10 of the cylinder body 2,
  sandblasting 22 of the cylinder body 2,
  neck threading 11 of the nozzle 10.

Figure 2:
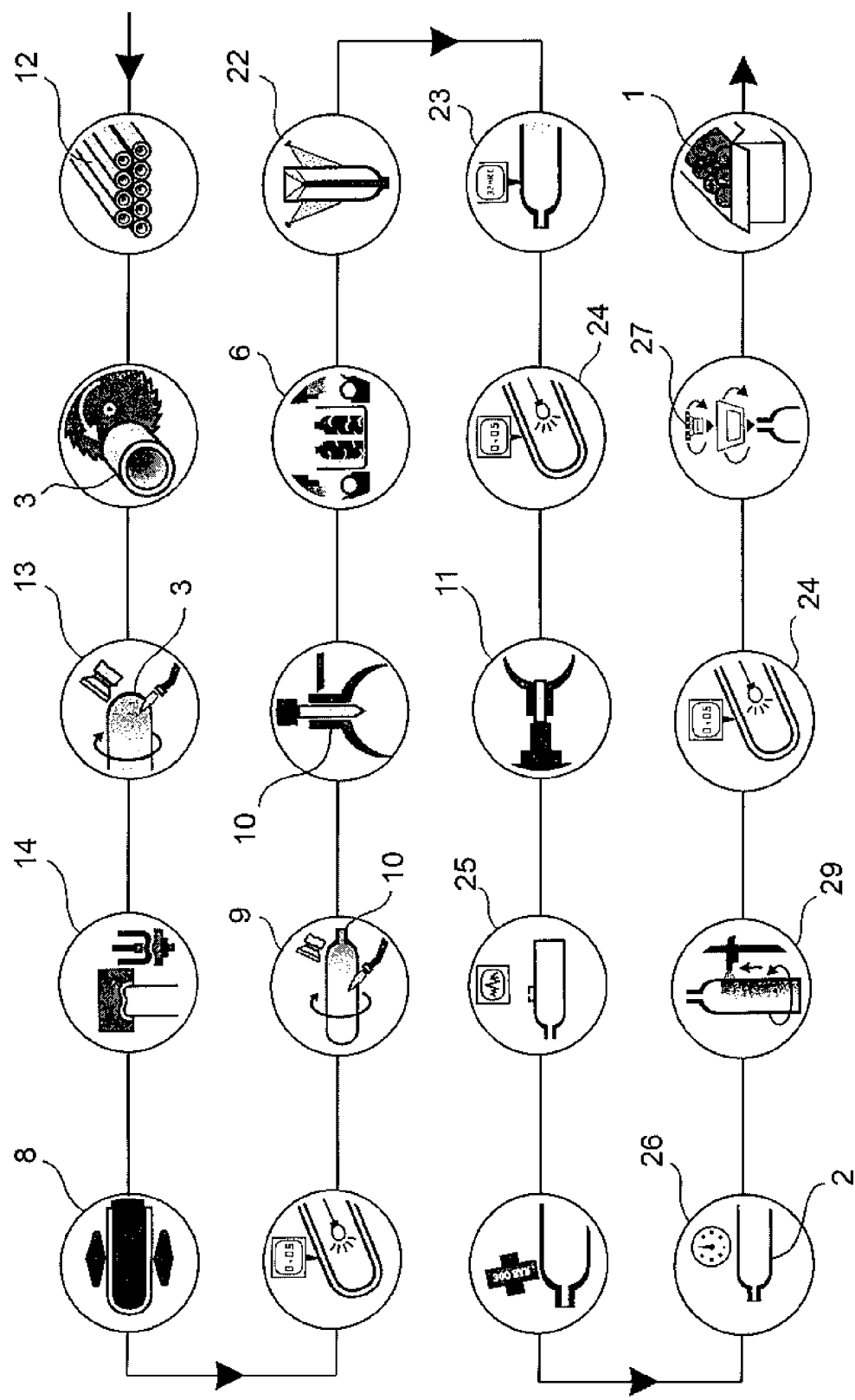
FIG. 2 is a schematic representation of a process for manufacturing gas cylinders with a metal cylinder body from an unrefined piece cut from a tube.

With reference to the example of FIG. 2 that represents the manufacture of the gas cylinder 1 from a unrefined piece 3 cut from a tube 12, the heat treatment steps can comprise one or more quenching and tempering steps 6, whereas the deformation steps can comprise one or more of the following steps:
  base spinning 13, for example through give spinning,
  base shaping and internal dressing 14 to form the base of the cylinder body 2,
  flow forming 8,
  neck spinning 9 of the nozzle 10 of the cylinder body 2,
  sandblasting 22 of the cylinder body 2,
  neck threading 11 of the nozzle 10.

Figure 3:
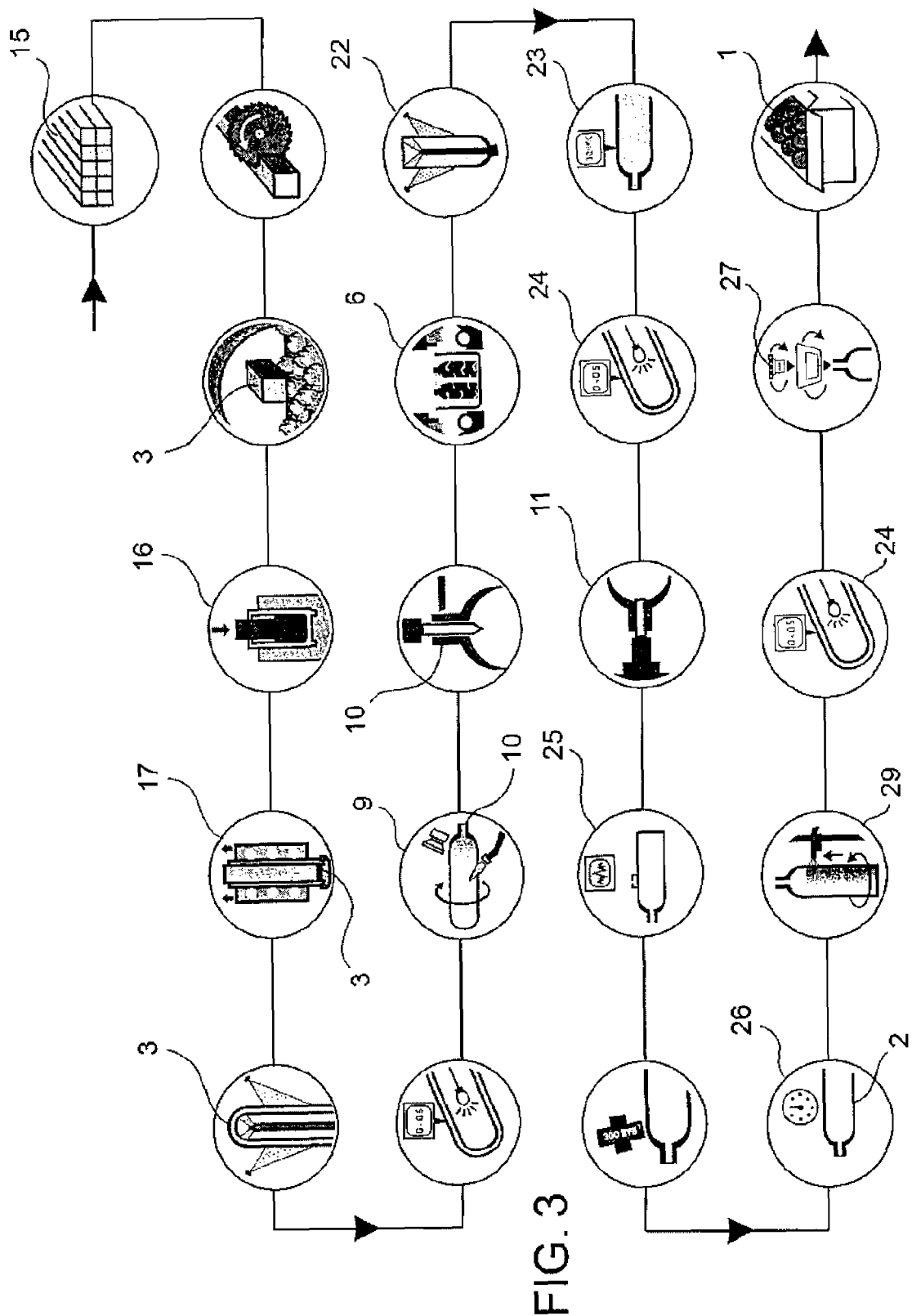
FIG. 3 is a schematic representation of a process for manufacturing gas cylinders with a metal cylinder body from an unrefined piece cut from a billet.
Figure 4:
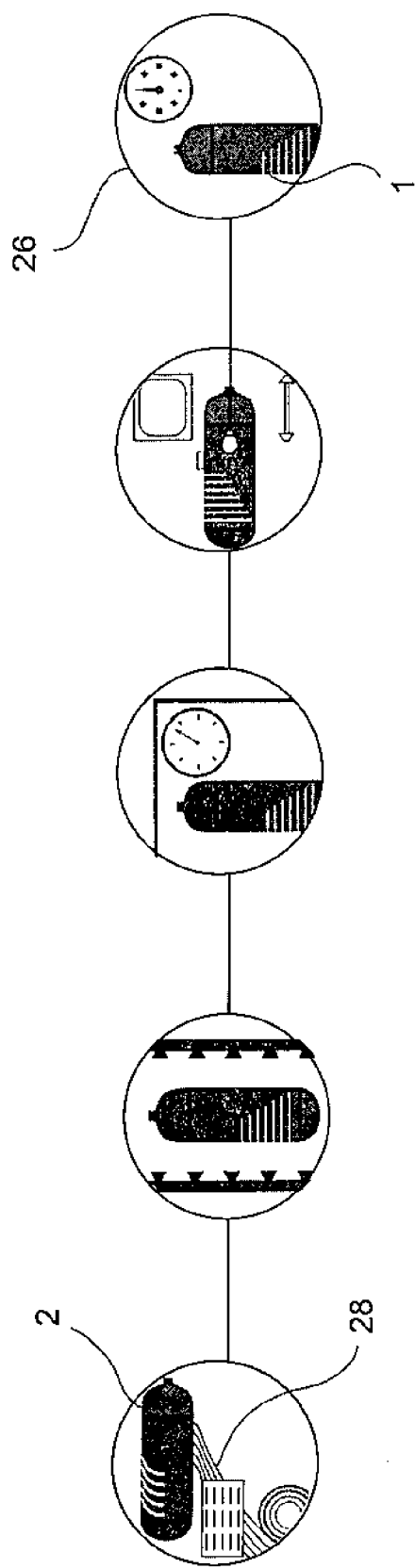
FIG. 4 is a schematic representation of an additional step of filament winding and curing in one of the processes in FIG. 1, 2 or 3.
Figure 5:
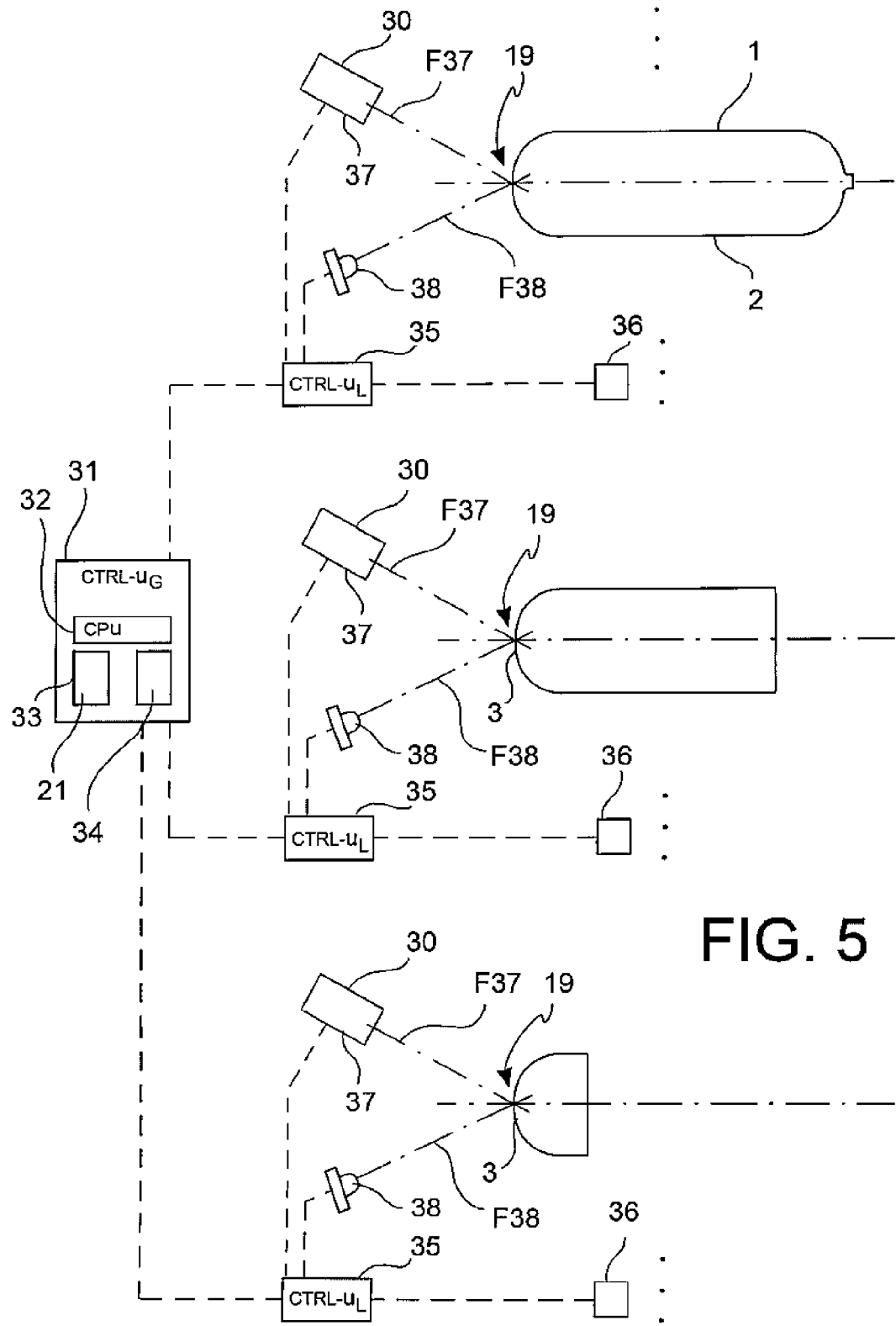
FIG. 5 is a schematic representation of a system for generating tracing information for gas cylinders in one of the processes in FIGS. 1 to 4, according to an embodiment of the invention.

With reference to the example of FIG. 3 that represents the manufacture of the gas cylinder 1 from an unrefined piece 3 cut from a billet 15, the heat treatment steps can comprise one or more quenching and tempering steps 6, whereas the deformation steps can comprise one or more of the following steps:
  cupping and hot piercing 16,
  wall thickness reduction 17,
  neck spinning 9 of the nozzle 10 of the cylinder body 2,
  sandblasting 22 of the cylinder body 2,
  neck threading 11 of the nozzle 10.

Moreover, the transformation steps can comprise one or more lubricating cycles 18, in particular associated with the cold deep-drawing steps 7.

According to the invention, the method for generating tracing information for gas cylinders 1 comprises the steps of:
  equipping the unrefined metal piece 3, before said transformation steps 5,6,7,8,9,11,14,17,18,22, with an individual marking 19 that comprises an identification code 20 of the single piece 3,
  reading the individual marking 19 applied onto the unrefined piece 3 and storing the read identification code 20 in a database 21,
  identifying, during at least one of the transformation steps 5,6,7,8,9,11,14,17,18,22 of the piece 3, the identification code 20 of the piece 3 by reading the individual marking 19 of the piece 3 and associating one or more process parameters of the transformation step 5,6,7,8,9, 11,14,17,18,22 with the identification code 20 read,
  storing the process parameters of the transformation step 5 . . . 22 and the association with the identification code 20 in the database.

Thanks to the marking through an identification code of the single piece and the association of process parameters of heat treatments and/or deformations with the identification code of the single piece it is possible to reconstruct the manufacturing history of each individual gas cylinder in greater detail and, therefore, to identify individual gas cylinders in a targeted manner based on specific selection parameters.

In accordance with an embodiment, the method comprises the steps of:
  identifying, during at least one of the deformation steps 7,8,9,11,14,17,22 of the piece 3, the identification code 20 of the piece 3 by reading the individual marking 19 of the piece 3 and associating one or more process parameters of the deformation step 7,8,9,11,14,17,22 with the identification code 20 read,
  storing the process parameters of the deformation step 7,8,9,11,14,17,22 and the association with the read identification code 20 in the database 21 and
  during at least one of the heat treatment steps 5,6 of the piece 3, identifying the identification code 20 of the piece 3 by reading the individual marking 19 of the piece 3 and associating one or more process parameters of the heat treatment step 5,6 with the identification code 20 read,
  storing the process parameters of the heat treatment step 5,6 and the association with the read identification code 20 in the database 21.

This makes it possible to tell between individual gas cylinders both based on process parameters of the deformation steps and based on process parameters of the heat treatment steps, during the transformation of the unrefined piece 3 in the cylinder body 2.

In accordance with a further embodiment, the metal cylinder body 2 obtained from the unrefined piece 3 is subjected to a hardness test 23 and the method comprises the steps of:

identifying, during the hardness test step 23, the identification code 20 of the cylinder body 2 by reading the individual marking 19 of the cylinder body 2 and associating a result of the hardness test 23 with the identification code 20 read, storing the result of the hardness test 23 and the association with the read identification code 20 in the database 21.

In accordance with yet another embodiment, the metal cylinder body 2 obtained from the unrefined piece 3 is subjected to one or more non-destructive testing steps of its characteristics and the method comprises the steps of:

identifying, during the non-destructive testing step, the identification code 20 of the cylinder body 2 by reading the individual marking 19 of the cylinder body 2 and associating a result of the non-destructive test with the read identification code 20, storing the result of the non-destructive test and the association with the read identification code 20 in the database 21.

The non-destructive testing steps can comprise one or more visual inspection steps 24 of the unrefined piece 3 or of the cylinder body 2 obtained from it and/or one or more ultrasonic inspection steps 25 of the cylinder body 2.

In accordance with yet another embodiment, the metal cylinder body 2 obtained from the unrefined piece 3 is subjected to a hydraulic test 26 with or without detection of the volumetric expansion and the method comprises the steps of:

identifying, during the hydraulic testing step 26, the identification code 20 of the cylinder body 2 by reading the individual marking 19 of the cylinder body 2 and associating a result of the hydraulic test with the identification code 20 read, storing the result of the hydraulic test 26 and the association with the read identification code 20 in the database 21.

In accordance with yet another embodiment, the metal cylinder body 2 obtained from the unrefined piece 3 is subjected to one or more assembly steps to complete the gas cylinder 1, for example the application of a valve 27 or of other accessories or filament winding and curing 28 in the case of a composite gas cylinder, and the method comprises the steps of:

identifying, during the assembly step, the identification code 20 of the cylinder body 2 by reading the individual marking 19 of the cylinder body 2 and associating an assembly parameter with the identification code 20 read, storing the assembly parameter and the association with the read identification code 20 in the database 21.

In accordance with yet another aspect of the invention, the metal cylinder body 2 obtained from the unrefined piece 3 is subjected to one or more finishing steps, for example painting 29, and the method comprises the steps of:

identifying, during the finishing step, the identification code 20 of the cylinder body 2 by reading the individual marking 19 of the cylinder body 2 and associating a finishing parameter with the identification code 20 read, storing the finishing parameter and the association with the read identification code 20 in the database 21.

In the description of the method provided here, the expression "during the . . . step" indicates that the procedural steps in question are carried out to coincide with the quoted transformation, testing, assembly and finishing steps, respectively of the unrefined piece, of the cylinder body and of the gas cylinder, i.e. immediately before, during or immediately after such steps.

The process parameters of the heat treatment steps 5,6 associated with the identification code 20 can comprise temperature and time values, in particular a temperature curve as a function of time, identification of the worker in charge of the work station and calibration characteristics of the work station, the so-called "set-up" of the work station.

The process parameters of the deformation steps 7,8,9,11, 14,17,22 associated with the identification code 20 can comprise the work recipe with geometric dimensions, work and waiting times, forward movement speed of the stamp/punch/roller, force and/or power absorbed, rotation speed of the cylinder body, sequence of movements of the stamp/punch/roller, temperature and time values, in particular a temperature curve as a function of time, sandblasting time and intensity, identification of the worker in charge of the work station and calibration characteristics of the work station, the so-called "set-up" of the work station.

The results of the hardness test 23 associated with the identification code 20 can comprise the hardness value detected and identification of the worker in charge of the testing station.

The results of the visual inspection 24 associated with the identification code 20 can comprise inspection judgements, identification and classification of anomalies found, as well as identification of the worker in charge of the inspection station.

The results of the ultrasonic inspection 25 associated with the identification code 20 can comprise a file containing an echogram, calibration characteristics of the inspection instrument, inspection judgements, identification and classification of anomalies found, as well as identification of the worker in charge of the inspection station.

The results of the hydraulic test associated with the identification code 20 can comprise values of volumetric expansion, of pressure applied and of the time of application of the pressure, as well as identification of the worker in charge of the testing station.

The assembly parameters associated with the identification code 20 can, for example, comprise characteristics of a valve 27 applied, the driving torque of the valve 27 or else process parameters of the filament winding and curing 28, identification of the reinforcing material, time and temperature values of the fixing and hardening step of the outer reinforcing layer, identification of the worker in charge of the work station and calibration characteristics of the work station, the so-called "set-up" of the work station.

The finishing parameters associated with the identification code 20 can comprise process parameters of painting 29, such as time and temperature values, identification of the paint, identification of the worker in charge of the work station and calibration characteristics of the work station.

Advantageously, in addition to the process parameters associated with the identification code 20 there can be an indication of working sequence, in other words the identification code 20 (n−1) of the previous piece and the identification code 20 (n+1) of the next piece worked in the same work station.

In this way it is possible to identify in a targeted manner the gas cylinders suffering from a processing anomaly that occurred in a certain work station for a certain time.

In accordance with an advantageous embodiment, the individual marking 19 is a permanent marking so as to eliminate a possible risk of identification errors of the piece 3 that can, on the other hand, occur in the case of temporary marking or labelling, subsequent processing of the piece partially or totally destroying the temporary marking and subsequent temporary re-marking or re-labelling of the piece.

The individual marking 19 is preferably arranged in a surface area of the unrefined piece 3 intended to form the outer surface of the base of the cylinder body 2 and can be made through mechanical punching through a matrix mounted on a die or, alternatively, through laser engraving.

The individual marking 19 itself is advantageously configured so as to be able to be detected and read automatically, despite the modifications in colour, shape and structure of the unrefined and semi-worked piece 3 and of the cylinder body 2 during the manufacture of the gas cylinder 1.

Indeed, according to a further aspect of the invention, the reading of the individual marking 19 of the piece 3 takes place automatically, for example through a plurality of optical detectors 30, each arranged at one of the work stations that carry out the aforementioned transformation, testing, assembly and finishing steps and in signal connection with a control unit 31.

Similarly, obtaining the process parameters and their association with the identification code 20 of the piece 3 and storing the identification codes 20, the process parameters and the associations of the process parameters with the identification codes 20 in the database 21 also occurs automatically through the control unit 31.

For this purpose, the control unit 31, for example a microcomputer with a processor 32, a memory 33 and a user interface 34, is connected with the optical detectors 30 and with a plurality of local process controllers 35 that control the processing steps of the unrefined and semi-worked piece 3 and of the cylinder body 2, and is configured to:
- receive data identifying the piece 3 or the cylinder body 2, for example files of one or more digital photographs of the individual marking 19, from the optical detectors 30,
- decoding the individual marking 19 to obtain the identification code 20 in digital form,
- receiving data containing the process parameters of transformation and, if foreseen, the process parameters of assembly and finishing, as well as the results of the tests from the local process controllers 35,
- associating the process parameters of transformation and, if foreseen, the process parameters of assembly and finishing, as well as the results of the tests (hereafter called "the process parameters") with the respective digital identification code 20 and
- storing the digital identification codes 20, the process parameters and the associations of the process parameters with the identification codes 20 in the database 21 that can be generated in the memory 33.

The process parameters can be obtained through reading of a database of the local process controller 35 or else through direct or indirect measurement through one or more process sensors 36.

Alternatively, the local process controllers 35 or a control unit directly associated with the optical detector 30 are configured to:
- receive data identifying the piece 3 or the cylinder body 2, for example files of one or more digital photographs of the individual marking 19 from the optical detectors 30,
- decode the individual marking 19 to obtain the identification code 20 in digital form,
- receive data containing the process parameters of transformation and, if foreseen, the process parameters of assembly and finishing, as well as the results of the tests from the local process controllers 35,
- associating the process parameters of transformation and, if foreseen, the process parameters of assembly and finishing, as well as the results of the tests (hereafter called "the process parameters") with the respective digital identification code 20 and
- send the digital identification codes 20, the process parameters and the associations of the process parameters with the identification codes 20 to the central control unit 31 that stores them in the database 21.

The optical detector 30 can comprise a telecamera 37 with lighting means 38, for example LEDs with a focusing lens, in which the focusing axis F37 of the telecamera 37 and the focusing axis F38 of the lighting means 38 are oriented in the direction of the individual marking 19 and are inclined with respect to one another and with respect to a middle plane of the individual marking 19, so as to generate and capture an image with lit areas and dark areas that are distinct from one another.

In order to locally enlarge the dark areas it may be advantageous to take two images of the individual marking 19 with different lighting orientation.

Figure 6:
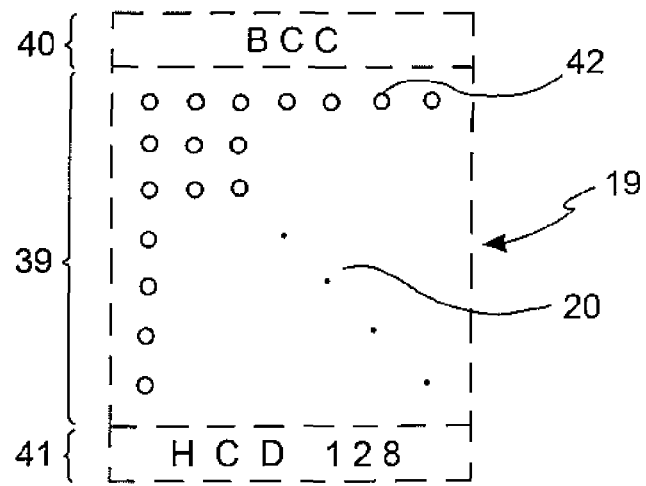
FIG. 6 is a schematic representation of an individual marking for a method for generating tracing information for gas cylinders according to an embodiment of the invention.

The individual marking 19 can comprise an encoding field 39 with pointed sectors or areas in bas-relief 42, for example of the datamatrix type, which encodes the identification code 20 of the cylinder body 2 and preferably a material code that identifies the production batch of the steel. Alongside the encoding field 39 an identification field 40 can be formed comprising an alphanumeric indication of the identification code 20, as well as a material field 41 that comprises an alphanumeric indication of the production batch of the steel (FIG. 6).

This makes any possible reading of the codes and their manual insertion by an operator easier, for example in the case of cross checks, and gives the present method and system an identification redundancy.

Figure 7:
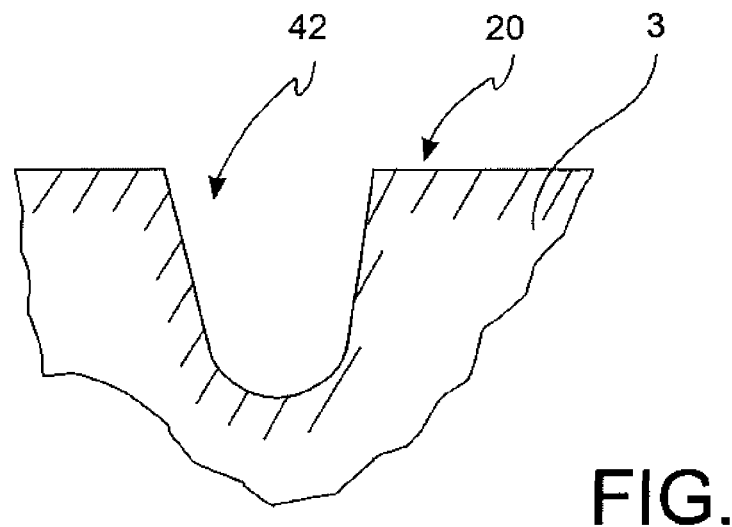
FIG. 7 is a section view of a detail of the individual marking in FIG. 6.

In accordance with an embodiment, the pointed areas in bas-relief 42 have a hemispherical or frusto-conical shape with rounded vertex and an initial depth of between 0.1 mm and 0.6 mm, preferably between 0.2 mm and 0.4 mm, even more preferably of about 0.3 mm (FIG. 7).

As an alternative to the telecamera 37, it is possible to foresee as laser scanner or a brush touch sensor configured to detect the areas in bas-relief of the individual marking 19.

Going back to the decoding of the image captured by the optical detector 30 and transmitted to the control unit 31 or to the local process controllers 35 or to a control unit directly associated with the optical detector 30, in accordance with an embodiment, such decoding can comprise one or more of the following steps:
- perspective correction of the image,
- application of a Gaussian smoothing filter, preferably at the pixel level and to the global image,
- application of a black/white filter at the pixel level,
- application of a noise filter in order to eliminate the pixels below a predetermined extension threshold,
- application of a Hugh transform and, thereafter, of a Fourier transform, as well as a convolution to orient the image of the datamatrix,
- decoding the datamatrix obtained.

It is also advantageous to use a plurality of for example 5 . . . 6 groups of decoding parameters, compare the identification codes decoded through a first group of decoding parameters with those stored in the database 21 and, in the case in which a decoded identification code is not present in the database 21, discard it and move on to a second group of decoding parameters, as well as "weigh" (in other words classify as first, second, third . . . ) the groups of decoding parameters separately for each processing step of the piece 3 and detection step of its identification code 20 according to the success in decoding.

In order to further increase the precision of reading the individual marking 19 the marking itself can be cleaned, for example through a blower of air or of a fluid in general or through mechanical brushing.

The database 21 generated and compiled through the method and the system described provides a set of information for the quick and targeted tracing of gas cylinders.

The man skilled in the art can unquestionably appreciate that the marking method and system and the method and system for detecting the marking and the method and system for processing the digital image detected described are particularly suitable for the manufacturing conditions of gas cylinders such that their combination with other characteristics of the system and method for generating tracing information for gas cylinders has highly advantageous synergic effects.

Nevertheless, it is expressly noted by the inventors that the marking method and system and the method and system for detecting the marking and the method and system for processing the digital image detected described can be advantageously used for marking, detecting the marking and tracing objects other than gas cylinders, in particular solid objects made from metal, synthetic or natural material.

Of course, a man skilled in the art can bring further modifications and variants to the method and to the system according to the present invention, in order to satisfy contingent and specific requirements, all of which are in any case covered by the scope of protection of the invention, as defined by the following claims.

The invention claimed is:

1. A method for generating tracing information for gas cylinders comprising a metal cylinder body, manufactured through the steps of:
   providing an unrefined metal piece;
   subjecting the unrefined metal piece to:
   A) one or more heat treatment steps to modify the mechanical characteristics of the piece and,
   B) one or more deformation steps to modify the shape of the piece,
   so as to obtain the cylinder body with the desired shape and material characteristics,
      subjecting the unrefined piece or the cylinder body obtained from it to at least one control step for identifying pieces whose characteristics do not correspond to predetermined target characteristics,
      in which said method further comprises the steps of:
   equipping the unrefined metal piece, before the heat treatment steps and deformation steps, with a permanent individual marking having an encoding field with areas in bas-relief in said unrefined metal piece, that comprises an identification code of the single piece and that permanently identifies the single unrefined metal piece and the single cylinder body obtained from it during the manufacture of the gas cylinder,
   reading the individual marking applied to the unrefined piece and storing the identification code read in a database,
   identifying, during at least one of the heat treatment steps and deformation steps or during said control step, the identification code of the piece or of the cylinder body obtained from it by reading the individual marking and associating one or more process parameters of said heat treatment step or deformation step or a result of said control step with said identification code, and
   storing said process parameters of said heat treatment step or deformation step or said result of said control step and the association with said read identification code in the database.

2. The method of claim 1, comprising the steps of:
   identifying, during at least one of the deformation steps of the piece, the identification code of the piece by reading the individual marking of the piece and associating one or more process parameters of the deformation step with the identification code read
   storing the process parameters of the deformation step and the association with the read identification code in the database and,
   during at least one of the heat treatment steps of the piece identifying the identification code of the piece by reading the individual marking of the piece and associating one or more process parameters of the heat treatment step with the identification code read, and
   storing the process parameters of the heat treatment step and the association with the read identification code in the database.

3. The method of claim 1, wherein said heat treatment steps comprise at least one annealing step and at least one quenching and tempering step.

4. The method of claim 1, wherein said deformation steps comprise at least one of the following steps:
   cold deep-drawing,
   flow forming,
   neck spinning of a nozzle of the cylinder body,
   sandblasting of the cylinder body,
   neck threading of the nozzle,
   base spinning through flow forming,
   base shaping and internal dressing to form the base of the cylinder body,
   cupping and hot piercing, and
   wall thickness reduction.

5. The method of claim 1, wherein the deformation steps also comprise at least one lubricating cycle associated with a cold deep-drawing step.

6. The method of claim 1, wherein the metal cylinder body obtained from the unrefined piece is subjected to a hardness test and the method further comprises the steps of:
   identifying, during the hardness test step, the identification code of the cylinder body by reading the individual marking of the cylinder body and associating a result of the hardness test with the identification code read,
   storing the result of the hardness test and the association with the read identification code in the database.

7. The method of claim 6, wherein the results of the tests and inspections associated with the identification code are selected from the group consisting of:
   the value of the detected hardness,
   inspection judgements,
   identification and classification of anomalies found,
   a file containing an echogram,
   calibration characteristics of the testing and inspection instrument,
   values of volumetric expansion, of pressure applied and of the pressure application time, and
   identification of the worker in charge of the testing station.

8. The method of claim 1, wherein the metal cylinder body obtained from the unrefined piece is subjected to one or more steps of non-destructive testing of its characteristics and the method further comprises the steps of:
   identifying, during the non-destructive testing step, the identification code of the cylinder body by reading the individual marking of the cylinder body and associating a result of the non-destructive test with the identification code read, and
   storing the result of the non-destructive test and the association with the read identification code in the database.

9. The method of claim 8, wherein said non-destructive testing steps comprise at least one visual inspection step of the cylinder body and at least one ultrasound inspection step of the cylinder body.

10. The method of claim 1, wherein the metal cylinder body obtained from the unrefined piece is subjected to a hydraulic test and the method further comprises the steps of:
identifying, during the hydraulic test step, the identification code of the cylinder body by reading the individual marking of the cylinder body and associating a result of the hydraulic test with the identification code read, and
storing the result of the hydraulic test and the association with the read identification code in the database.

11. The method of claim 1, wherein the metal cylinder body obtained from the unrefined piece is subjected to at least one assembly step to complete the gas cylinder, and the method further comprises the steps of:
identifying, during the assembly step, the identification code of the cylinder body by reading the individual marking of the cylinder body and associating and assembly parameter with the identification code read, and
storing the assembly parameter and the association with the read identification code in the database.

12. The method of claim 11, wherein said assembly steps comprise at least one of the steps of:
applying a valve or other accessories, and
filament winding and curing in the case of a composite gas cylinder.

13. The method of claim 11, wherein the assembly parameters associated with the identification code are selected from the group consisting of:
characteristics of a valve applied,
the driving torque of the valve,
process parameters of the filament winding and curing,
identification of the reinforcing material,
time and temperature values of a filament winding and curing step,
identification of the worker in charge of the work station, and
calibration characteristics of the work station.

14. The method of claim 1, wherein the metal cylinder body obtained from the unrefined piece is subjected to at least one finishing step, and the method further comprises the steps of:
identifying, during the finishing step, the identification code of the cylinder body by reading the individual marking of the cylinder body and associating a finishing parameter with the identification code read, and
storing the finishing parameter and the association with the read identification code in the database.

15. The method of claim 1, wherein the process parameters of said heat treatment steps and deformation steps associated with the identification code are selected from the group consisting of:
temperature and time values,
identification of the worker in charge of the work station,
calibration characteristics of the work station,
the processing recipe,
geometric dimensions of the tool,
speed of movement of the tool,
power absorbed,
force applied,
rotation speed of the cylinder body, and
sequence of movements of the tool.

16. The method of claim 1, wherein the process parameters of said heat treatment steps and deformation steps associated with the identification code also comprise an indication of the sequence of the pieces worked in the same work station.

17. The method of claim 1, wherein the reading of the individual marking of the piece, the act of obtaining the process parameters of said heat treatment steps and deformation steps, their association with the read identification code and the storing of the identification codes, of the process parameters and of the associations of the process parameters with the identification codes in the database takes place automatically.

18. The method of claim 1, further comprising the step of obtaining said process parameters of said heat treatment steps and deformation steps by reading a database of a local process controller and by detecting through at least one process sensor.

19. The method of claim 1, wherein said individual marking comprises:
an encoding field with sectors in bas-relief that encodes the identification code of the cylinder body and a material code that identifies the production batch of the unrefined material,
an identification field comprising an alphanumeric indication of the identification code, and
a material field comprising an alphanumeric indication of the production batch of the unrefined material.

20. The method of claim 1, wherein said method comprises:
using a control unit comprising a processor, a memory and a user interface and being in data connection with a plurality of local process controllers that control the processing steps of the unrefined piece,
using a plurality of optical detectors in signal connection with the control unit and arranged at respective work stations that carry out the heat treatment steps and deformation steps of the unrefined piece, said optical detectors being configured to detect the individual marking of the piece,
and wherein the control unit is configured to for:
receiving data representing the individual marking detected from the optical detectors,
decoding the individual marking to obtain the identification code in digital form,
receiving data containing the process parameters from the local process controllers,
associating the process parameters with the respective digital identification code and
storing the digital identification codes, the process parameters and the associations of the process parameters with the identification codes in the database generated in the memory.

21. The method of claim 20, wherein said optical detector comprises a telecamera with lighting means, wherein a focusing axis of the telecamera and a focusing axis of the lighting means are oriented in the direction of the individual marking and are inclined with respect to one another and with respect to a middle plane of the individual marking, so as to generate together with the individual marking to capture an image with lit areas and dark areas that are distinct from one another.

22. The method of claim 21, wherein the optical detector is configured so as to capture two images of the individual marking with different lighting orientation.

23. The method of claim 20, wherein the individual marking comprises a datamatrix with areas in bas-relief and the control unit is configured so as to decode the image of said datamatrix through the following steps:

perspective correction of the image,
application of a Gaussian smoothing filter,
application of a black/white filter at the pixel level,
application of a noise filter in order to eliminate the pixel below a predetermined extension threshold,
application of a Hough transformation and, thereafter, of a Fourier transformation, as well as a convolution to orient the image of the datamatrix, and
decoding the datamatrix obtained.

24. The method of claim 20, wherein the control unit is configured so as to:
use a plurality of individual groups of decoding parameters to decode the identification code,
compare the identification codes decoded through a first group of decoding parameters with the identification codes stored in the database and, in the case in which a decoded identification code is not present in the database, reject it and move on to a second group of decoding parameters and so on,
classify the individual groups of decoding parameters as first, second, third and so on, according to their success in decoding the identification codes, separately for each work station.

25. A method for generating tracing information for gas cylinders comprising a metal cylinder body, manufactured through the steps of:
providing an unrefined metal piece;
subjecting the unrefined metal piece to:
A) one or more heat treatment steps to modify the mechanical characteristics of the piece and,
B) one or more deformation steps to modify the shape of the piece,
so as to obtain the cylinder body with the desired shape and material characteristics,
subjecting the unrefined piece or the cylinder body obtained from it to at least one control step for identifying pieces whose characteristics do not correspond to predetermined target characteristics,
in which said method further comprises the steps of:
equipping the unrefined metal piece, before the heat treatment steps and deformation steps, with a permanent individual marking having an encoding field with areas in bas-relief in said unrefined metal piece, that comprises an identification code of the single piece and that permanently identifies the single unrefined metal piece and the single cylinder body obtained from it during the manufacture of the gas cylinder,
reading the individual marking applied to the unrefined piece and storing the identification code read in a database,
identifying, during at least one of the heat treatment steps and deformation steps, the identification code of the piece or of the cylinder body obtained from it by reading the individual marking and associating one or more process parameters of said heat treatment step or deformation step with said identification code, and
storing said process parameters of said heat treatment step or deformation step and the association with said read identification code in the database, and
identifying, during said control step, the identification code of the piece or of the cylinder body obtained from it by reading the individual marking and associating a result of said control step with said identification code,
storing said result of said control step and the association with said read identification code in the database.

* * * * *